US008340701B1

(12) United States Patent
Lan et al.

(10) Patent No.: US 8,340,701 B1
(45) Date of Patent: Dec. 25, 2012

(54) METHODS FOR USER-INTERFACE OVER SMS MESSAGES BASED ON A REUSABLE CONTEXT MODEL (75) Inventors: Divon Lan, Tel Aviv (IL); Natalia Marmasse, Ichud (IL); Mark Grossmann, Rishon Lezion (IL); Shai Gutner, Modi'in (IL); Michal Maor, Mazor (IL); Dror Marcus, Tel Aviv (IL); Tal Franji, Hod HaSharon (IL)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/152,223

(22) Filed: Jun. 2, 2011

(51) Int. Cl.
H04W 4/00 (2009.01)
(52) U.S. Cl. ............... 455/466; 455/414.1; 455/411; 455/412.2; 370/351; 370/388
(58) Field of Classification Search .......... 455/410–411, 455/418–420, 466, 414.1, 404.1
See application file for complete search history.

(56) References Cited

U.S. PATENT DOCUMENTS

| 2008/0188207 A1* | 8/2008 | Lee ........................ 455/414.1 |
| 2008/0254815 A1* | 10/2008 | Murphy et al. .............. 455/466 |
| 2009/0036149 A1* | 2/2009 | Liu et al. ................... 455/466 |
| 2009/0197579 A1* | 8/2009 | Celik ....................... 455/414.1 |
| 2010/0279716 A1* | 11/2010 | Benco et al. ............... 455/466 |

OTHER PUBLICATIONS

Example of Applications of SMS Messaging, retrieved from <http://www.developershome.com/sms/sms_tutorial.asp?page=egApps>, Sep. 16, 2011.
Nexsites Interactive SMS, nexmedia, retrieved from <http://nexmedia.com.sg/nexsites-components/nexsites-interactive-sms.html>, Sep. 16, 2011.
Mobile/SMS Solutions, Smash, retrieved from <http://www.smashcode.com/solutions>, Sep. 16, 2011.
The Mobile Application Server, Smash, retrieved from <http://www.smashcode.com/node/117>, Sep. 16, 2011.
Uses, Smash, retrieved from <http://www.smashcode.com/products/uses>, Sep. 16, 2011.
Schedule Summary for the Hands-on Labs, BOFs, and Sessions, JavaOne, <http://java.sun.com/javaone/sf/2008/schedule_detail.jsp>, Sep. 16, 2011.
TS-5584 Building Interactive Mobile Messaging (Short Message Service) Applications, Technical Session, Michael Juntao Yuan, eZee Inc., May 9, 2008, Moscone Center—Hall E 133.

* cited by examiner

Primary Examiner — Marcos Batista
Assistant Examiner — Keith Fang
(74) Attorney, Agent, or Firm — McDermott, Will & Emery LLP (57) ABSTRACT Configurations providing a reusable context model for a user interface over SMS for interacting with different levels of a user interface (UI) within an interactive system are described. An SMS server can implement the reusable context model in which an available number from a sequence of numbers (e.g., a block of numbers) is assigned to a first level of the UI. The first level of the UI can include a set of options corresponding to different operations within the interactive system. When an SMS message, which includes a selected option from the set of options from the first level of the UI, is received over the assigned number, the SMS server can determine whether to assign an additional number from the sequence of phone numbers for responding to the received SMS message. The additional assigned number can correspond with a second level of the UI within the interactive system.

14 Claims, 8 Drawing Sheets

Stage 510

Stage 520

Stage 530

Stage 540

METHODS FOR USER-INTERFACE OVER SMS MESSAGES BASED ON A REUSABLE CONTEXT MODEL

BACKGROUND

In particular geographical areas in which wireless Internet/broadband infrastructure is not prevalent or insufficient, a Short Message Service (SMS) can be utilized to enable communication via wireless mobile devices. However, current SMS implementations impose limited functionality for accessing different levels of an interactive system because of inherent limitations with SMS. Some implementations may require users to remember complex and non-intuitive command line syntax in order to communicate over SMS. Additionally, because of the stateless nature of SMS, tracking the context in which a respective SMS message is interacting with the system is problematic because the user may switch between different commands/options in the system.

Moreover, the delivery of an SMS message is not guaranteed, let alone, to be delivered according to an expected order or sequence. Therefore, SMS implementations may result in delayed or lost SMS delivery that introduces problems in providing interactive user interfaces.

SUMMARY

The subject technology provides for receiving a first SMS message to initiate a user session associated with the interactive system. An available first phone number is assigned from a sequence of phone numbers to a first level of a user interface (UI) within the interactive system. A second SMS message is transmitted from the first phone number in response to the first SMS message in which the second SMS message includes a set of options corresponding to the first level of the UI. A third SMS message is received from the first phone number in which the third SMS message includes a selected option from the first level of the UI. An available second phone number is assigned from the sequence of phone numbers to a second level of the UI in which the second level of the UI corresponds to the selected option from the first level of the UI. A fourth SMS message is transmitted from the second phone number in response to the third SMS message in which the fourth SMS message includes a set of options corresponding to the second level of the UI.

Another aspect of the subject technology provides for receiving a first SMS message over a phone number in which the phone number is associated with a user session for an interactive system. The subject technology determines whether another phone number from a sequence of phone numbers is assigned to a corresponding level within the UI of the interactive system for responding to the first SMS message. An available phone number is assigned if another phone number is not assigned for responding to the first SMS message. A second SMS message is transmitted over the assigned phone number for responding to the SMS message.

In another aspect, the subject technology provides, for a first phone number assigned to a first level of a user interface within the interactive system, determining whether the first phone number is inactive during a first period of time. The status of the first phone number is changed from a busy status to a stale status if the first phone number is inactive during the first period of time. The status of the first phone number is changed from the stale status to a free status after a second period of time has elapsed.

In yet another aspect, the subject technology provides system for providing a user-interface over a Short Message Service (SMS) to enable functionality in an interactive system. The system includes an SMS front-end server configured to provide one or more modules to perform different functionality. The SMS front-end server includes a session module configured to assign an available first number from a sequence of phone numbers to a first level of a user interface (UI) within the interactive system and to assign an available second number from the sequence of phone numbers to a second level of the UI. The SMS front-end server further includes a reception module configured to receive a first SMS message from a communication device for interacting with the first level of the UI. The SMS front-end server includes a transmission module configured to transmit a second SMS message for responding to the first SMS message over the second number to the communication device. In one aspect, the reception module is further configured to receive a third SMS message from the communication device for interacting with a second level of the UI within the interactive system. In one aspect, the transmission module is further configured to transmit a fourth SMS message for responding to the third SMS message over a third phone number from the sequence of phone numbers to the communication device.

In one aspect, the subject technology provides for receiving a first SMS message from a user to initiate a user session in which the user session is associated with the interactive system. An available first phone number is assigned from a sequence of phone numbers to a first level of a user interface (UI) within the interactive system. A second SMS message is transmitted over the first phone number in response to the first SMS message in which the second SMS message includes a set of options from the first level of the UI. A third SMS message is received over the first phone number in which the third SMS message includes a selected option from the set of options from the first level of the UI. An available second phone number is assigned among the sequence of phone numbers for responding to the third SMS message. The assigned second phone number corresponds to a second level of the UI within the interactive system, and the second level corresponds to the selected option from the first level of the UI. A fourth SMS message is transmitted over the second phone number in response to the third SMS message in which the fourth SMS message includes a second set of options from the second level of the UI.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

To enable functionality to perform more complex tasks with an interactive system, a method for providing a user-interface for an interactive system using SMS based on a reused context model is described. In some implementations, the method uses a block of phone numbers to send and receive SMS messages to an SMS server for allowing complex user interactions such as menu-trees, list browsing and drill-down interaction over several menu/list levels.

In a reused context model, an SMS server can provide a user-interface over SMS for interacting with a one or more levels of menu UI for an associated interactive system. A respective phone number from the block of phone numbers can be assigned to facilitate communication with the associated interactive system. During an activity period, the SMS server can assign different phone numbers from the block in order to provide for selection of options from and navigation of one or more levels of the interactive system. As used herein, the expression "activity period" can be understood as a time period in which a user interacts with the interactive system by transmitting one or more SMS messages to the SMS server. The user therefore can interact with different levels of the interactive system over one or more assigned phone numbers.

The user can first send an SMS message to an SMS server to initiate a user session corresponding with a particular interactive system. The SMS server can determine a first available phone number to assign to the user session for the interactive system and place the first number in a busy status to indicate its assignment to the interactive system. The SMS server can then transmit a subsequent SMS message to the user over the assigned phone number that includes a first set of options corresponding to a first level of a menu user interface (UI) within the interactive system. The SMS server can keep this phone number assigned to the user during the activity period in which the user can select one or more different options from the first level of the menu UI by transmitting different SMS messages to the first phone number.

During the activity period, the SMS server can assign a respective phone number for each level in the menu UI to allow the user to select different options from a particular level of the menu UI. For instance, a second and third phone number can be assigned to other levels of the menu UI. The user can then transmit one or more SMS messages to the second and third phone numbers in order to select options for the corresponding menu UI levels assigned to the second and third phone numbers. To return to the above-mentioned first level of the menu UI, the user can subsequently transmit another SMS message that includes a selected option from the first level to the first phone number. In this manner, the user can select different options and navigate different levels of the menu UI by transmitting SMS messages to the assigned phone numbers corresponding to different levels of the menu UI.

The following description describes the interaction between a user's communication device and the aforementioned SMS server. The SMS server can provide a user interface over SMS based on a reusable context model in which more than one phone number can be assigned from a sequence of phone numbers to enable interaction between the user and multiple levels of a user interface for an interactive service.

Figure 1:
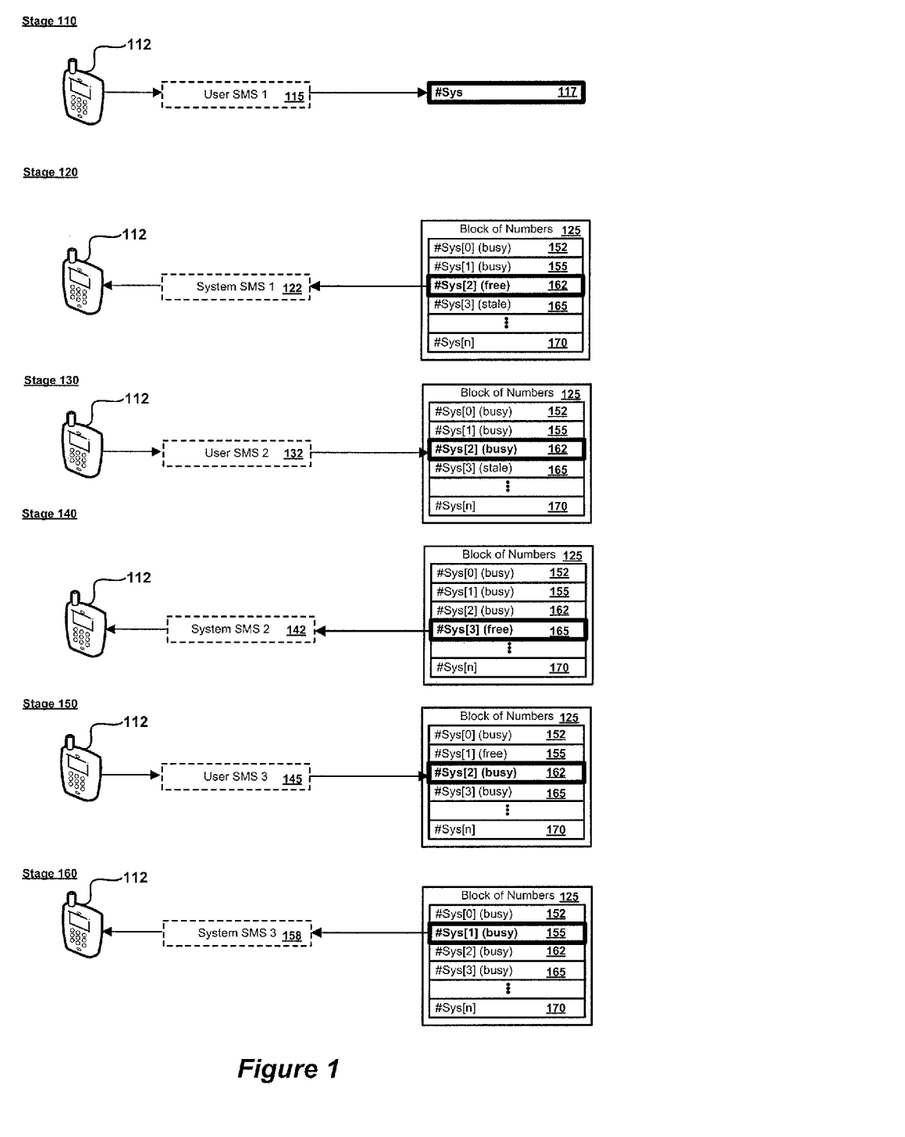
FIG. 1 conceptually illustrates a communication flow between a communication device and an SMS server utilizing a reusable context model.

FIG. 1 conceptually illustrates a communication flow between a communication device and an SMS server utilizing a reusable context model. More specifically, FIG. 1 illustrates the communication flow in different stages 110-160 between a communication device 112 and an SMS server for providing an interactive user interface over SMS. As used herein, a communication device can include, but is not limited to, a mobile device, handheld device, a personal digital assistant, a cellular phone, smartphone, tablet computer, laptop, etc.

In the first stage 110, the communication device 112 transmits an SMS message 115 to the SMS server represented by a system number 117. As shown, the system number 117 is represented as a single "short code" number "#Sys" that the communication device can use to transmit the SMS message 115 to initiate a user session with the SMS server. By way of example, the SMS message 115 can include a command to access a service via the SMS server, such as mail, chat, social networking, blogging, etc. Each service can represent an interactive system that provides a complex set of commands and menus (e.g., one or more different levels of menus that provide access to other commands) that are not easily provided based on the limitations of SMS.

In the second stage 120, the SMS server manages a block of numbers 125 which is used to implement the reusable context model for providing a user interface over SMS. As illustrated, the block of numbers 125 includes a sequence of phone numbers 152-170. In some configurations, the SMS server utilizes an index (e.g., 0 to n where 0 represents the first number and n is the last number) to access a particular phone number in the sequence of phone numbers. The SMS server can place each number from the sequence of phone numbers 152-170 in a respective status to indicate whether the corresponding phone number is currently assigned to a user session. By way of example, each phone number can be assigned in a free, busy, or stale status. In some configurations, an available number is in a free status (i.e., currently not assigned to a user session), a busy number is currently assigned to the user session, and a stale number indicates that the number is inactive (i.e., assigned to the user session but no activity).

After receiving the SMS message 115 from the first stage 110, the SMS server assigns a first available phone number to a user session corresponding to the interactive system accessed by the command from the SMS message 115. The first available number can be a phone number currently in a free status. In some configurations, the SMS server can iterate or scan through the block of numbers 125 to determine a first number in a free status to assign to the user session. As shown in FIG. 1, the SMS server assigns a phone number 162 (as indicated by #Sys[2] in bold) that is currently in a free status from the block of numbers 125 to the user session.

In some configurations, the SMS message 122 includes a set of options corresponding to a first level of a menu user interface (UI) within the interactive system. As used herein, a level can be understood as a menu level within the menu UI. The menu UI can include one or more different menu levels in which each menu level includes a corresponding set of options or commands. For a given command included in the SMS message from the communication device 112, the SMS server can provide a set of options from a menu level responsive to that command. In an example in which the initial SMS message from the communication device 112 includes a command for accessing a mail service, the SMS server can transmit a subsequent SMS message including one or more options for the mail service (e.g., send mail, browse mail, browse contacts, etc.) to the communication device 112. As further shown in the second stage 120, the SMS server then transmits an SMS message 122 over the phone number 162 in response to the SMS message 115 from the first stage 110. The SMS message can include a set of options corresponding to a first level of a menu user interface (UI) within the interactive system.

In the reusable context model, the SMS server can assign a phone number to a corresponding level of the UI within the interactive system. In the second stage 120, the SMS server has assigned the phone number 162 to the first level of the UI within the interactive system. For a subsequent SMS message received from the phone number 162, the SMS server can transmit a response SMS message corresponding to a selected option from the first level of the UI within the interactive system.

In the third stage 130, the communication device 112 transmits an SMS message 132 to the SMS server represented by the system number 117. As mentioned above, in the reusable context module, the SMS server can utilize an assigned phone number for responding to a command corresponding to a menu level of a menu UI of the interactive system. In other words, an assigned phone number as used in the reusable context model corresponds with a particular menu level of the menu UI. From a usability viewpoint, the user can then re-utilize each assigned number (e.g. by transmitting an SMS message over the assigned number) for performing commands within the menu level corresponding with the assigned number. For each SMS message received over the assigned number, the SMS server can respond to the included command and selected option for the corresponding menu level of the menu UI from each SMS message. The SMS message 132 received by the SMS server over the phone number 162 can include a selected command corresponding to a respective option from the first level of the menu UI (e.g., as included in the set of options in the SMS message 122 from the second stage 120). As further shown in the third stage 130, the phone number 162 is now in a busy status after the SMS server changed the status of the phone number 162 from the free status in the second stage 120. The SMS server therefore can change the status of each assigned phone number to busy status after assigning each assigned phone number for responding to a corresponding received SMS message.

In the fourth stage 140, the SMS server assigns an available phone number from the block of numbers 125 for responding to the command in the SMS message 132 from the third stage 130. For instance, the SMS server can determine an available phone number from the block of numbers 125 and then select the available number to assign to the second user session. As shown, the SMS server assigns a phone number 165 that is designated by an index value of 3 (i.e., Sys[3]), which is a currently available phone number. The SMS server then transmits an SMS message 142 over the phone number 165 in response to the SMS message 132 from the third stage 130. In some configurations, the SMS message 142 includes a set of options corresponding to a second level of the menu UI within the interactive system. In the reusable context model, the SMS server can maintain the phone number 165 for receiving and responding to an SMS message which include a selected command corresponding to a respective option from the second level of the menu UI.

In the fifth stage 150, the communication device 112 transmits an SMS message 145 to the SMS server over the phone number 162. The SMS message 145 includes a second selected command corresponding to a different option from the first level of the menu UI. In the reusable context model, the communication device 112 (i.e., the user) can interact with different levels of the menu UI within the interactive system. As further shown in the fifth stage 150, the phone number 165 is now in a busy status after the SMS server has changed the status of the phone number 165 from a free status in the fourth stage 140.

As illustrated, the SMS server in the sixth stage 160 transmits an SMS message 158 over a phone number 155 responsive to the SMS message 145 received from the fifth stage 150. In the sixth stage 160, the SMS server has assigned the phone number 155 to correspond with a third level of the menu UI (shown in the sixth stage 160 in the busy status and previously in the free status in the fifth stage 150). By way of example, the SMS server therefore can include a third set of options corresponding to the third level of the menu UI in the SMS message 158 transmitted to the communication device 112 over the phone number 155.

In the reusable context model, it should be understood that the user can interact with different levels of the menu UI within the interactive system by sending an SMS message over a particular phone number corresponding with a respective level of the menu UI. In some configurations, for example, the SMS server can then receive a subsequent SMS message from the communication device 112 over the phone number 165 in which the subsequent SMS message includes a selected command or option corresponding to a respective operation from the second level of the menu UI. Similarly, the SMS receive a subsequent SMS message from the communication device over the phone number 162. The user therefore can interact with another level of the menu UI within the interactive system in this manner.

Although the above description of FIG. 1 relates to three different levels of the menu UI of the interactive system corresponding to the phone numbers 155, 162 and 165, one of ordinary skill in the art would appreciate that the SMS server could utilize additional phone numbers for additional levels of the menu UI by assigning other available phone numbers. Additionally, although FIG. 1 illustrates a single block of numbers 125, the SMS server can manage additional blocks of numbers not shown in FIG. 1. Therefore, it should be understood that the SMS server can implement the reusable context model described above by utilizing several sequences of phone numbers provided in additional blocks of numbers.

Figure 2:
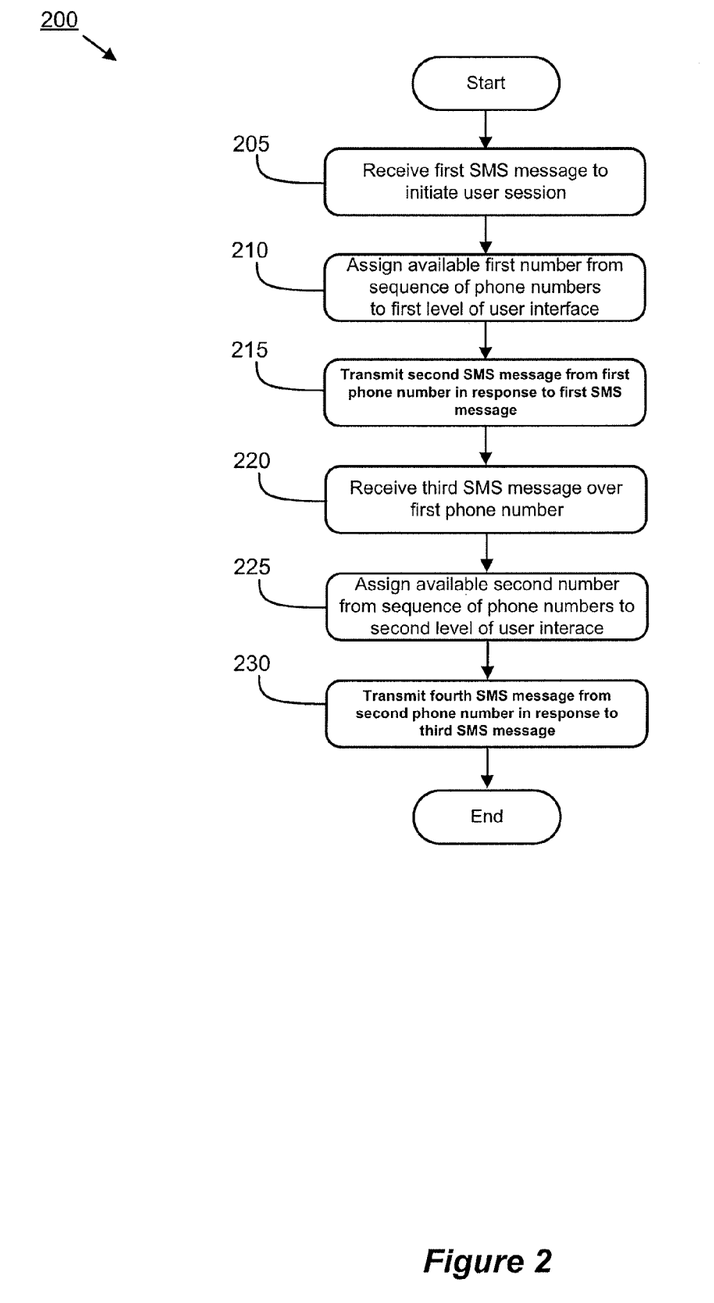
FIG. 2 conceptually illustrates an exemplary process for implementing a reusable context model for providing a user interface over SMS.

The following discussion describes an exemplary process for implementing the reusable context model for providing a user interface over SMS as described above. The aforementioned SMS server of some configurations can implement such a process described in further detail below. FIG. 2 conceptually illustrates an exemplary process 200 for implementing a reusable context model for providing a user interface over SMS. FIG. 2 will be described below by reference to relevant portions of FIG. 1.

The process 200 begins when a first SMS message is received at 205 to initiate an SMS session. Referring to FIG. 1, the communication device 112 transmits the SMS message 115 to initiate the SMS session that is received by the SMS server (represented by the system number 117). In some configurations, the SMS server receives the first SMS message over a system number as shown in the first stage 110 of FIG. 1. The system number of some configurations can be an access number (e.g., a sequence of digits) in which the communication device (i.e., the user) can transmit the first SMS message to access one of the services provided over SMS by the SMS server. By way of example, the process 200 can receive the first SMS message that includes a text string corresponding to a command (e.g., mail, chat, blog, etc.) that activates a particular service.

At 210, the process 200 assigns an available first number from a sequence of phone numbers in response to the first SMS message to initiate the user session. The SMS server at 210 can then determine an available first phone number (i.e., a number in a free status) from the sequence of numbers managed by the SMS server. By reference to FIG. 1, the SMS server assigns the phone number 162 (i.e., #Sys[2]) to the SMS session from the block of numbers 125 in the second stage 120. In the reusable context model, the SMS server utilizes each assigned number for handling incoming SMS messages which include a command or a selected option within a particular level of the menu UI of the interactive system. Each assigned phone number therefore corresponds with a level within the menu UI of the interactive system.

The process 200 at 215 transmits a second SMS message from the first phone number (i.e., the assigned first available number from 210) to the user in response to the first SMS message. The second SMS message in some configurations includes a set of options corresponding to a first level of a menu UI within the interactive system. Referring to FIG. 1, in the second stage 120 the SMS server transmits the SMS message 122 that includes the set of options from the first level of the menu UI to the communication device 112 in response to the SMS message 115 received in the first stage 110 that initiates the user session.

The process 200 at 220 receives a third SMS message over the first phone number that includes a selected command corresponding to a respective option from the first level of the menu UI. Referring to FIG. 1, in the third stage 130 the SMS server receives the SMS message 132 that includes the selected command corresponding to an option from the set of options from the first level of the menu UI from the communication device 112 over the phone number 162.

At 225, the process 200 assigns an available second phone number from the sequence of phone numbers for responding to the third SMS message from 220. To implement the reusable context model, the process 200 can assign an available number (i.e., in a free status) among the sequence of phone numbers for responding to an SMS message that includes a selected command from a set of options corresponding to a particular level within the menu UI. In this example, the received third SMS message includes the selected option that upon execution navigates to a different level (e.g., a second level) of the interactive system. For responding to the third SMS message, the process 200 therefore assigns the second phone number corresponding to a second level of the menu UI of the interactive service. With reference to FIG. 1, the SMS server in the fourth stage 140 assigns the phone number 165 for responding to the SMS message 132 from the third stage 130.

The process 200 continues to 230 to transmit a fourth SMS message from the second phone number to the user in response to the third SMS message. The fourth SMS message includes a second set of options corresponding to a second level of the menu UI. Returning to FIG. 1, the SMS server transmits the SMS message 142 in the fourth stage 140 in response to the SMS message 132 from the third stage 130. The process 200 then ends.

In the reusable context model, the user can return to a previous level (e.g., the first level) of the menu UI by transmitting a subsequent SMS message over the assigned phone number corresponding to the previous level. In one example, a subsequent SMS message, which includes a second selected command from the set of options from the first level of the UI, is received from the first phone number assigned from 210. The second selected command can correspond with yet another level of the menu UI of the interactive system. The process 200 therefore can assign another available phone number from the sequence of phone numbers to this additional level of the menu UI. Referring to FIG. 1, the SMS server in the fifth stage 150 receives the SMS message 145 from the communication device 112 over the phone number 162 that was assigned to the first level of the UI from the second stage 120. In the sixth stage 160, the SMS server assigns the phone number 155 to another level of the menu UI within the interactive system for responding to the SMS message 145 from the fifth stage 150.

Although the process 200 described above assigns two different phone numbers to two levels of the menu UI within the interactive system, one of ordinary skill in the art can appreciate that the process 200 could assign additional phone numbers from the sequence of phone numbers to additional levels of the menu UI as subsequent SMS messages that include a selected option from a corresponding level are received. In such an instance, the process 200 can repeat similar operations to steps 220 and 225 to assign a respective phone number from the sequence of phone numbers to an additional level of the menu UI. The process 200 can then repeat a similar operation to step 230 to respond to the selected option by transmitting an SMS message over the newly assigned phone number to the user. In this manner, the process 200 provides different phone numbers for responding to commands in SMS messages for different levels of the menu UI within the interactive system.

As mentioned above, in the reusable context model, the user can return to a previous level of the menu UI by transmitting an SMS message over the previously assigned phone number (e.g., after transmitting a previous SMS message over another assigned phone number corresponding to a different level of the menu UI). The SMS message transmitted over the previously assigned phone number can include a different selected option from the previous level of the menu UI. The SMS server therefore keeps track of the respective level of the menu UI corresponding to an assigned number from the sequence of phone numbers. In an instance in which the SMS server has not assigned a number to a particular level of the menu UI, the SMS server can then determine an available number for assigning to the level of the menu UI. In the reusable context model, the SMS server therefore should determine whether to assign an available number to a level or re-utilize a previously assigned number for responding to a received SMS message.

Figure 3:
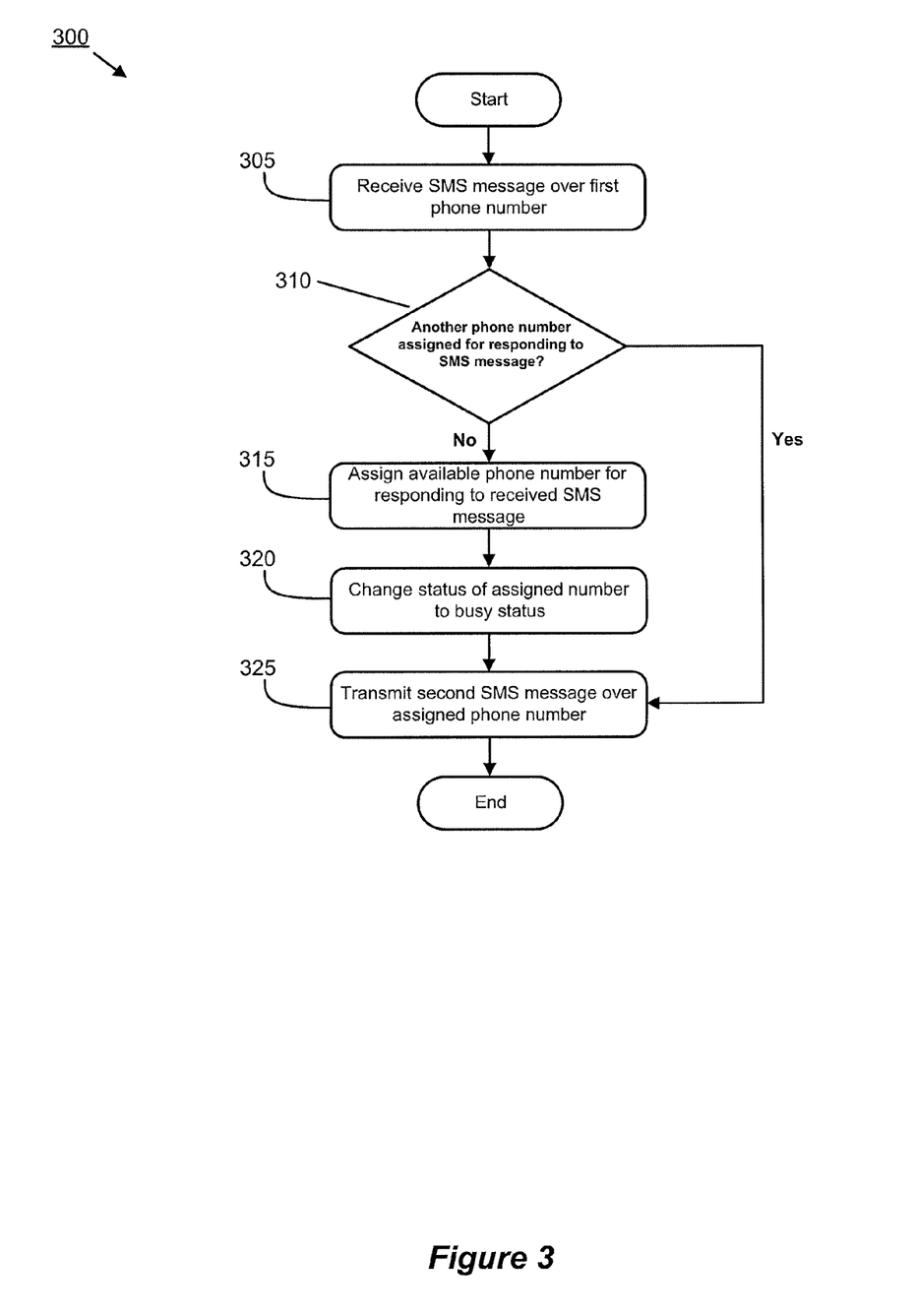
FIG. 3 conceptually illustrates an exemplary process in the reusable context model for determining a phone number for responding to an SMS message received over a particular phone number.

FIG. 3 conceptually illustrates an exemplary process 300 in the reusable context model for determining a phone number for responding to an SMS message received over a particular phone number. More specifically, the process 300 implements one aspect of the reusable context model in which a determination is made to assign an available number to a level of a menu UI or re-utilize a previously assigned number for responding to a received SMS message. In some configurations, the SMS server can implement such a process described in further detail below.

The process 300 starts at 305 when an SMS message is received over a first phone number. The first phone number can be associated with a user session for the interactive system. In some configurations, the first phone number corresponds to a respective level of the menu UI within the interactive system. The SMS message therefore can include a selected option from a set of options from the corresponding level of the menu UI.

At 310, the process 300 determines whether another phone number from a sequence of phone numbers is assigned for responding to the SMS message. In some configurations, the process 300 can query a data structure (e.g., table, list, etc.) that maps each assigned phone number to a corresponding option(s) from the menu UI. The process 300 can therefore determine an assigned phone number (if any) for an included selected option from the SMS message. Based on the determination at 310, the process 300 either proceeds to 315 or 325.

In the event that another phone number is assigned for responding to the SMS message, the process 300 continues to 325. At 325, the process 300 transmits a second SMS message over the assigned phone number determined at 310. The second SMS message can include a response to selected option from the received SMS message at 305. Alternatively, the second SMS message can include a set of options from a corresponding level of the menu UI within the interactive system. The process 300 then ends.

Alternatively, if the process 300 determines that no phone number from the sequence of phone numbers is assigned for responding to the first SMS message, the process continues to 315. At 315, the process 300 assigns an available phone number (i.e., in a free status) for responding to the received first SMS message. In some configurations, the process 300 can iterate through the sequence of phone numbers to determine which phone number is currently in a free status for assigning. The assigned phone number is now associated with a user session for the interactive system. At 320, the process 300 changes the status of the assigned phone number to a busy status.

The process 300 then continues to 325 to transmit a second SMS message over the assigned phone number from 315 for responding to the received SMS message from 305. The second SMS message can either include a response to the selected option included in the received SMS message or a set of options from a corresponding level of the menu UI within the interactive system. The process 300 then ends.

As mentioned above, the SMS server can change the status of a phone number from a free status to a busy status after assigning the phone number to a user session. Given that the sequence of phone numbers is a finite block of numbers, the SMS server can be configured to monitor activity on each assigned phone number (i.e., currently in a busy status) in order to release one or more numbers into a pool of available numbers for assigning to additional user sessions. In particular, an assigned number in some instances may not have sufficient activity to remain assigned to the user session. The SMS server therefore can be configured to momentarily change the status of the assigned number from a busy status to a stale status to indicate that the user session corresponding to the assigned number has expired (i.e., due to insufficient activity).

Figure 4:
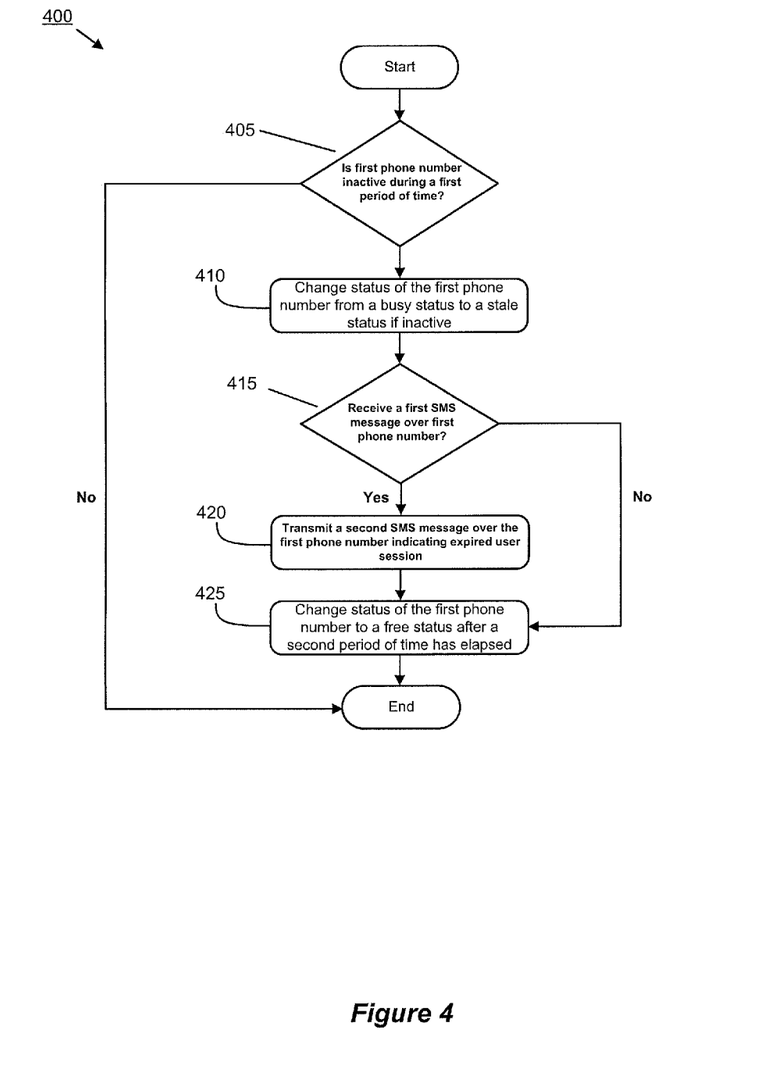
FIG. 4 conceptually illustrates an exemplary process for changing a status of an inactive phone number assigned to a user session to a stale status and notifying a user when the phone number is stale.

The following discussion describes an exemplary process for determining whether an assigned phone number to a user session is inactive and to notify a user that the user session is now considered to have expired due to inactivity. The SMS server of some configurations can implement such a process described in further detail below. FIG. 4 conceptually illustrates an exemplary process 400 for changing a status of an inactive phone number assigned to a user session to a stale status and notifying a user when the phone number is stale.

The process 400 begins at 405 to determine, for a first phone number assigned to a first user session, whether the first phone number is inactive during a first period of time. In some configurations, the first period of time is an adjustable time period. By way of example, the first period of time can be adjusted based on an administrator setting or parameter (e.g., a session timeout setting as set via an administrator tool). In another aspect, the first period of time can be determined based on an average session time. The average session time, for example, can be determined by tracking the respective session times for several sessions and averaging the session times.

Inactivity in the context of the first user session can be determined based on not receiving or transmitting at least one SMS message from a communication device or the SMS server during the first period of time. The process 400 in some configurations can monitor the activity over the first phone number by tracking incoming and outgoing data traffic of SMS messages. The process can consider the assigned first phone number as inactive after the first period time has elapsed and no SMS message is sent or received over the first phone number. Alternatively, if the process 400 determines that the first phone number is not inactive (i.e., active) during the first period of time, then the process 400 ends.

The process 400 continues to 410 to change the status of the first phone number from a busy status to a stale status if the process 400 determines that the first phone number is inactive at 405. In some configurations, the process 400 transmits an SMS message to the communication device to notify the user that the first phone number is currently stale. Upon being placed into the stale status, the first phone number is not available for assigning to another user nor is the first number available for receiving an SMS message from the communication device. In the reusable context model, an SMS server will not assign a user session to any number in a stale status from a sequence of phone numbers. Additionally, the SMS server will not process any SMS message transmitted over any number in a stale status.

At 415, the process 400 makes a determination whether a first SMS message is received over the first phone number. In some configurations, the process 400 can make this determination at 415 during a second period of time. The second period of time can be adjusted utilizing any of the aforementioned techniques discussed in connection with the first time period. The process 400 continues to 425 if no SMS message is received over the first phone number. Alternatively, the process 400 continues to 420 if the process 400 determines at

415 that an SMS message is received over the first phone number. In the reusable context model, the SMS server of some configurations will not process any received SMS message because the first phone number is now in a stale status. The user session therefore is considered invalid or expired. The process 400 can then notify the user of the expired user session by transmitting an SMS message over first phone number to the user. At 420, the process 400 transmits a second SMS notifying the user of the expired user session.

Given that the sequence of phone numbers is a finite block of numbers (i.e., a limited resource), the SMS server can release numbers that have been set in a stale status for assigning to other user sessions. In some configurations, the SMS server can wait for a second period of time before making the number available for assigning to a user session. After the second period of time has elapsed, the process 400 at 425 changes the status of the first phone number from the stale status to a free states.

Although FIG. 4 illustrates that the second SMS message indicating the expired user session is transmitted at 420 after receiving the first SMS message, the process 400 can transmit an SMS message indicating the expired user session irrespective of receiving the first SMS message. In other words, the process 400 in some configurations can transmit an SMS message indicating the expired user session after changing the status of the first phone number from a busy status to a stale status at 410.

The following discussion relates to a communication flow between the SMS server and the communication device for aspects of FIG. 4 described above. More specifically, the SMS server can release an inactive assigned number to a user session and notify a user (i.e., a communication device) that the user session has expired.

Figure 5:
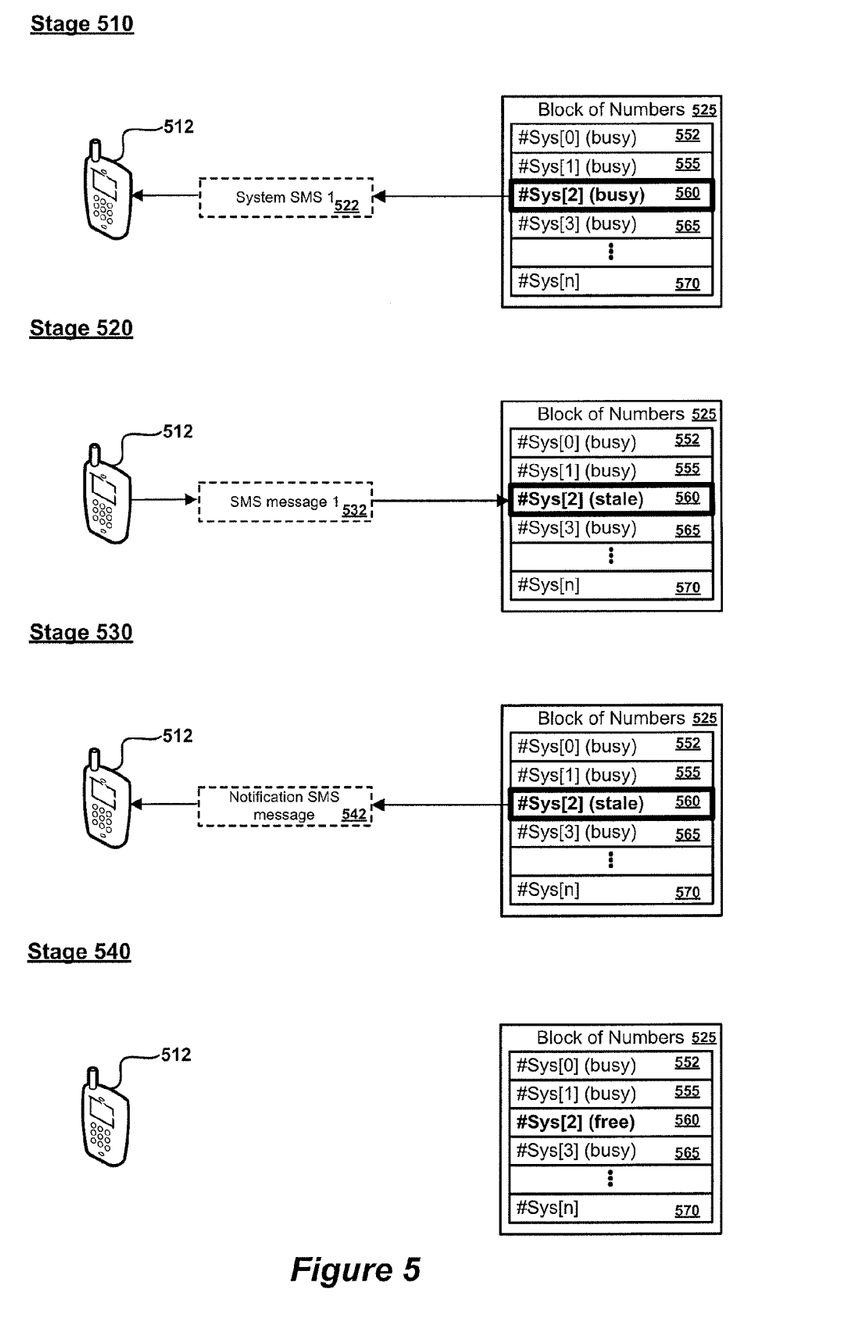
FIG. 5 conceptually illustrates an exemplary communication flow between the SMS server and a communication device (i.e., user) for releasing an assigned number from a block of phone numbers after a user session has expired from inactivity.

FIG. 5 conceptually illustrates an exemplary communication flow between the SMS server and a communication device (i.e., user) for releasing an assigned number from a block of phone numbers after a user session has expired from inactivity. FIG. 5 will be discussed with reference to portions of FIG. 4.

As shown, FIG. 5 illustrates a communication flow in four stages 510-540 between a communication device 512 and an SMS server managing a block of numbers 525, which includes first to nth phone numbers 552-570. The SMS server manages the block of numbers 525 in order to provide a user interface over SMS based on the reusable context model.

In the first stage 510, the SMS server transmits a SMS message 522 over a phone number 560 assigned to a first user session (as illustrated in bold) to the a communication device 512. As shown, the assigned phone number 560 is currently in a busy status. In some configurations, the SMS server transmits the SMS message 522 after receiving a previous SMS message from the communication device 512. For instance, the communication device 512 can transmit the previous SMS message to initiate the user session (e.g., by transmitting the SMS message over the system number) and the SMS server can assign a first available phone number (i.e., in a free status) to the user session. In response to a command or selected option included in the previous SMS message, the SMS server can transmit the SMS message 522 over the assigned phone number 560 to the communication device 512.

In the second stage 520, the SMS server changes the status of the assigned phone number 560 to a stale status after a first period of time has elapsed in which no activity occurs over the phone number 560. The SMS server of some configurations can monitor activity over the phone number 560 by tracking the transmission and reception of data (i.e., one or more SMS messages). If the SMS server does not detect any activity over the phone number 560 during the first period of time, the SMS server changes the status of the phone number 560 to a stale status as shown in the second stage 520. The user session assigned to the phone number 560 is considered expired (i.e., invalid) and therefore the SMS server will not process a received SMS message. Referring to FIG. 4, the process 400 at 405 determines whether the first phone number is inactive during the first period of time and changes the status of the first phone number to the busy status at 410.

As further shown in the second stage 520, the communication device 512 transmits an SMS message 532 over the phone number 560 when the first phone number is in the stale status. Referring back to FIG. 4, the process 400 at 415 determines whether an SMS message is received over the first phone number after changing the status of the first phone number to the stales status at 410.

In response to the SMS message 532 from the second stage 520, the SMS server can transmit an SMS message notifying the communication device 512 that the user session has expired. In the third stage 530, the SMS server transmits an SMS message 542 over the phone number 560 to the communication device 512 indicating that the user session has expired. Upon receipt, the user of the communication device 512 will be notified of the expired user session corresponding to the phone number 560. By way of example, the SMS message 542 can include alphanumerical message such as, "User session expired. Please transmit another SMS message to initiate another user session." One of ordinary skill in the art would appreciate that any suitable message could be included in the SMS message 542 for notifying the user. By reference to FIG. 4, the process 400 at 420 transmits the second SMS message over the first phone number indicating the expired user session.

The SMS server can release the phone number 560 for assigning to another user session. In some configurations, the SMS server can wait a second period of time before releasing the phone number currently in the stale status. As shown in the fourth stage 540, the SMS server changes the status of the phone number 560 to a free status from the stale status in the third stage 530. Referring to FIG. 4, the process 400 at 425 changes the status of the first phone number to the free status after the second period of time has elapsed.

Figure 6:
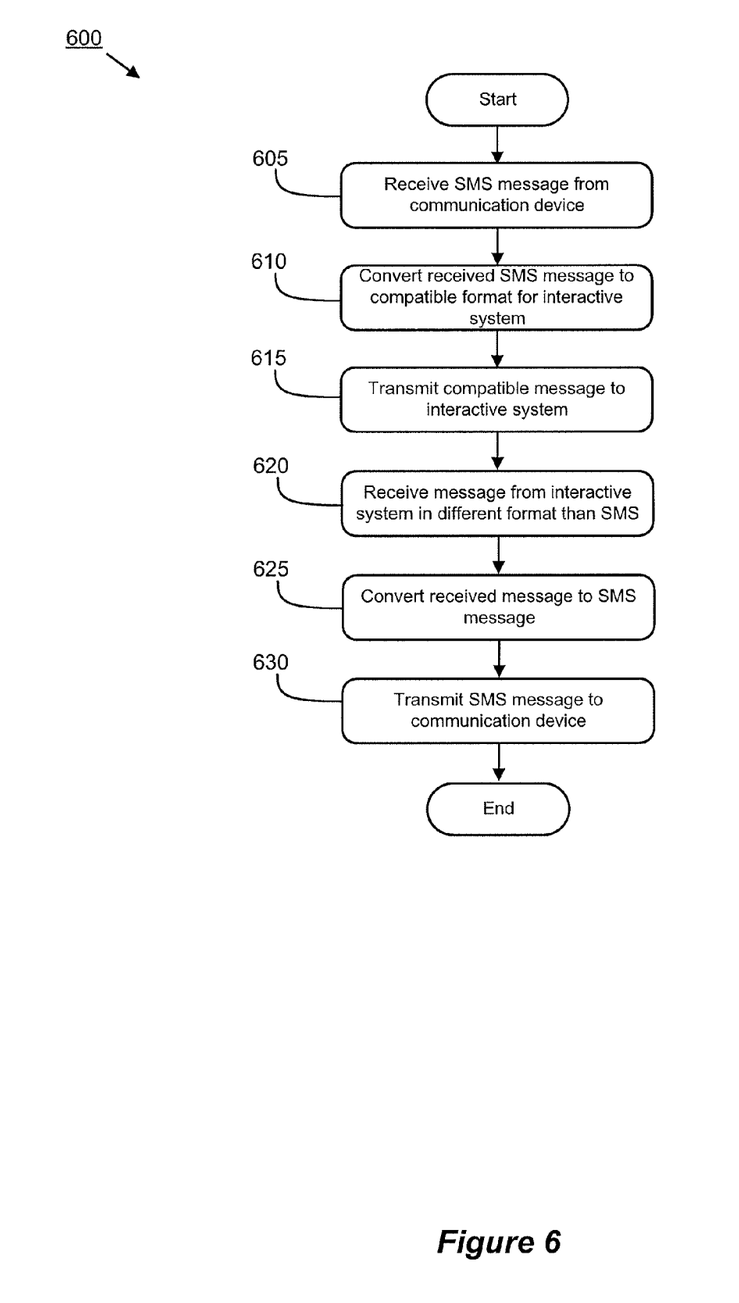
FIG. 6 conceptually illustrates an exemplary process for converting an SMS message to a compatible format for an interactive system.

The following discussion describes an exemplary process that can be implemented by an SMS server to convert SMS messages from a user (i.e., a communication device) and messages received from an interactive system to facilitate a message flow between the communication device and interactive system. FIG. 6 conceptually illustrates an exemplary process 600 for converting an SMS message to a compatible format for an interactive system. In particular, FIG. 6 illustrates a request-response communication flow in which the process 600 converts an incoming SMS message (e.g., from the communication device) for transmission to the interactive system, and converts an incoming message from the interactive system in response for transmission to the communication device. The process 600 of some configurations can be performed conjunctively with the processes 200 and/or 300 described above in FIGS. 2 and 3 for providing a reusable context model for interacting with the interactive system.

The process 600 begins at 605 when an SMS message is received from a communication device. For example, the process 600 can receive the SMS message over a phone number (e.g., a first phone number) assigned to a user session or over a system number (i.e., #Sys) before a phone number is assigned to the user session. In some configurations, the SMS message can include a command to access a service provided by the interactive system or include a selected option from a level of the interactive system.

At 610, the process 600 converts the received SMS message to a compatible format for the interactive system. In particular, the interactive system may process data and/or messages in a different format that is incompatible with the SMS message format. The process 600 therefore converts the SMS message to enable the interactive system to process the included command or selected option from the SMS message. For example, the process 600 can convert the SMS message data into the compatible format by performing a data transformation. In some configurations, the process 600 can extract alphanumerical data corresponding to the command or selected option from the SMS message and subsequently include the extracted data in the compatible message. The process 600 at 615 then transmits the compatible message to the interactive system.

After executing an operation in response to the compatible message, the interactive system of some configurations can transmit a message to the SMS server in response. At 620, the process 600 receives a message in a different format than the SMS message format from the interactive system. The message from the interactive system can include the results of executing the selected option from a level in the interactive system or include a set of options from the level. The process 600 at 625 then converts the received message into the SMS message format for transmission to the communication device. At 630, the process 600 transmits the SMS message to the communication device. The process 600 then ends.

The above described operations in FIG. 6 illustrate an example of a single request-response communication flow between the communication device and the interactive system for converting messages. However, one of ordinary skill in the art would understand that the process 600 could be repeatedly performed for more than one request-response communication flow. For example, in the reusable context model, the SMS server can assign a second number to a different level of the menu UI within the interactive system. It should be understood that the process 600 can then perform the operations in FIG. 6 for messages that are received and transmitted over the second number corresponding to the different level of the menu UI.

The following section describes an exemplary computing environment including an SMS server that can implement the above described processes as a computer program running on a particular machine, such as a computer, or stored as instructions in a computer readable medium.

Figure 7:
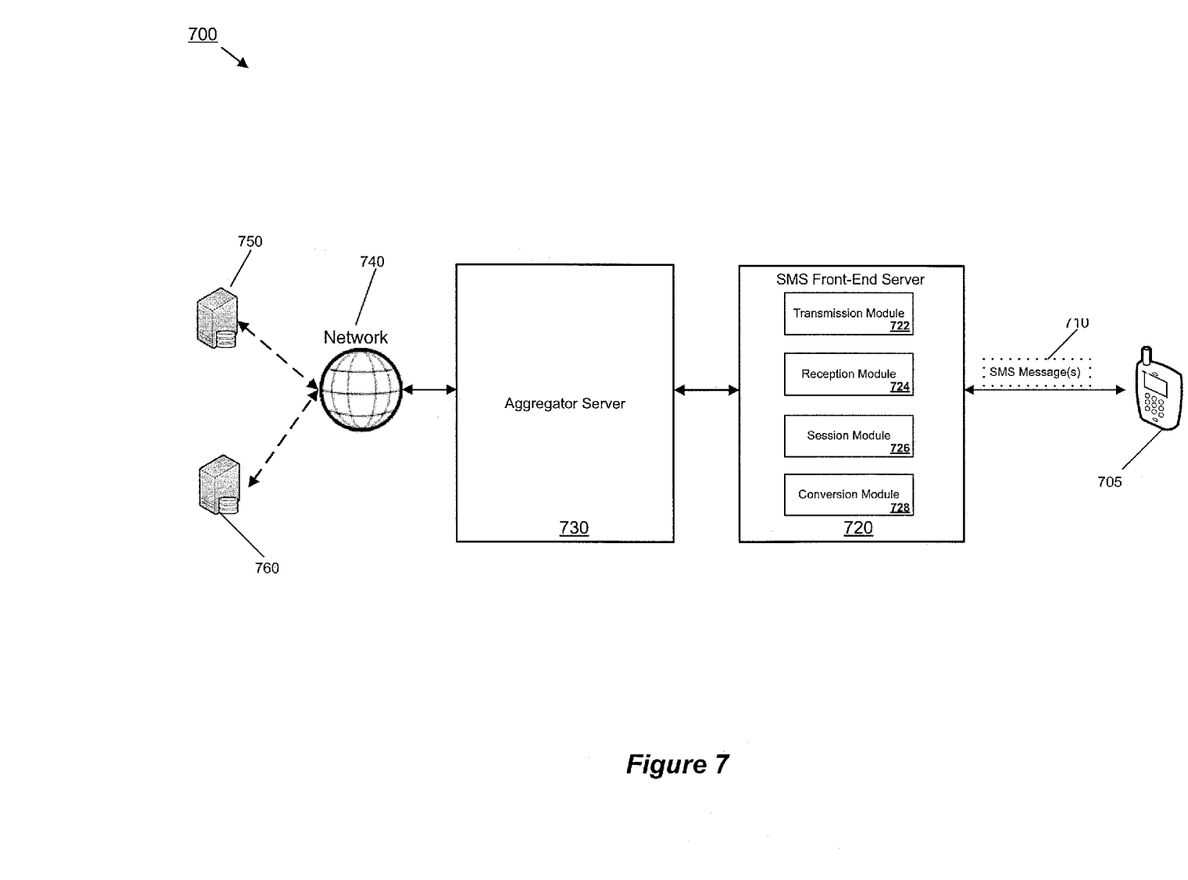
FIG. 7 conceptually illustrates an exemplary computing environment including an SMS server of some configurations.

FIG. 7 conceptually illustrates an exemplary computing environment 700 including an SMS server of some configurations. In particular, FIG. 7 shows an SMS front-end server 720 for implementing the above described processes in FIGS. 2-4 and 6 that manage a sequence of phone numbers for providing a user interface over SMS to an interactive service. In some configurations, the SMS front-end server 720 is part of a server-based implementation running a particular machine connected to a network.

The SMS front-end server 720 of some configurations includes different modules for providing different functionality. As illustrated in FIG. 7, the SMS front-end server 720 includes a transmission module 722 configured to transmit SMS messages, a reception module 724 configured to receive SMS messages, a session module 726 configured to manage a sequence of numbers, and a conversion module 728 configured to convert non-SMS messages to SMS messages and vice versa. To implement the reusable context model, the SMS front-end server 720 includes the session module 726 that assigns an available first number (i.e., in a free status) from the sequence of numbers to a first level of a user interface (UI) within the interactive system. The SMS front-end server 720 includes the reception module 724 that receives a first SMS message from a communication device for interacting with the first level of the UI. In some configurations, the first SMS message includes a selected command from a set of options from the first level of a menu UI within the interactive system. The session module 726 of the SMS front-end server 720 is further configured to assign an available second number from the sequence of phone numbers to a second level of the UI. The transmission module 722 of the SMS front-end server 720 is further configured to transmit a second SMS message for responding to the first SMS message over the second number to the communication device. The second SMS message can be responsive to the selected command corresponding to the first level of the UI.

In the reusable context model, the reception module 724 of the SMS front-end server 720 is further configured to receive a third SMS message from the communication device for interacting with the second level of the UI. Additionally, the transmission module 722 of the SMS front-end server 720 is configured to transmit a fourth SMS message for responding to the third SMS message over a third phone number from the sequence of phone numbers to the communication device. The fourth SMS message can be responsive to a second command corresponding to the second level of the menu UI within the interactive server.

For each phone number assigned for responding to a received SMS message, the session module 726 of the SMS front-end server 720 can be configured to determine whether another phone number has been previously assigned for responding to the received SMS message. In the reusable context model, the user (i.e., the communication device) can navigate to different levels of the menu UI by transmitting an SMS message over an assigned phone number. In response to the received SMS message, the transmission module 722 of the SMS front-end server 720 is configured to determine whether to transmit a response SMS message over the phone number in which the SMS message was received (e.g., by the reception module 724) or over another assigned phone number. In some configurations, the session module 726 of the SMS front-end server 720 is configured to assign an additional available phone number for responding to the received SMS message.

The session module 726 of the SMS front-end server 720 is further configured to monitor activity over the aforementioned phone numbers in order to determine whether the phone number should be released due to inactivity and can change the status of any phone number from a busy status to a stale status in response. Further, the session module 726 of the SMS front-end server 720 is configured to release any phone numbers in a stale status to a free status to enable any such numbers to be assigned to different levels of the menu UI within the interactive system.

As shown, the computer environment 700 includes a communication device 705, the SMS front-end server 720, an aggregator server 730, a network 740, and interactive service servers 750 and 760. The SMS front-end server 720 and the communication device 705 can engage in a two-way communication flow for providing a user interface to an interactive system over SMS as described above in FIGS. 1 and 5 and the processes in FIGS. 2-4. For instance, the reception module 724 of the SMS front-end server 720 can receive one or more SMS message(s) 710 that includes a selected option (e.g., from a level in the interactive service) or a command for executing by the interactive service from the communication device 705. Similarly, the transmission module 722 of the SMS front-end server 720 can also transmit one or more SMS message(s) 710 to the communication device 705 that includes a response to the selected option or command from the interactive service. The conversion module 728 of the SMS front-end server 720 can convert any received SMS message 710 to a compatible format for transmitting to the aggregator server 730.

The SMS front-end server 720 communicates with the aggregator server 730 to provide the user interface over SMS for one or more interactive service servers. In some configurations, the aggregator server could be located in the same location as the SMS front-end server 720 (e.g., local network) or over a remote network. The aggregator server 730 of some configurations provides an interface to one or more different interactive service servers that provide different interactive services such as e-mail, chat, social networking, blogging, etc. In particular, the aggregator server 730 can utilize an application programming interface (API) to access the interactive service servers 750 and 760 over the network 740, which can include, but is not limited to, a local network, remote network, or an interconnected network of networks (e.g., Internet). Based on the converted SMS message(s) from the SMS front-end server 720, the aggregator server 730 can access the interactive service servers 750 and 760 using one or more API calls to perform different operations. Although two different interactive service servers are illustrated in FIG. 7, one of ordinary skill in the art would realize that the aggregator server 730 could interface with any number of different interactive servers to access different services.

The interactive service servers 750 and 760 can process the API call(s) from the aggregator server 730 and transmit a response message(s) to the aggregator server 730. A response message can include the results of executing the selected option or command corresponding to a previously submitted SMS message from the communication device 705. After receiving the response message(s), the aggregator server 730 transmits the response message(s) to the SMS front-end server 720. In some configurations, the conversion module 728 of the SMS front-end server 720 can convert the received response message(s) into an SMS format for transmitting to the communication device 705. For example, the conversion module 728 of the SMS front-end server 720 can perform a data transformation operation involving one or more different steps to convert the received response message from a corresponding interactive service server into a SMS message format.

In the exemplary computing environment 700 illustrated in FIG. 7, the SMS front-end server 720 and the aggregator server 730 are shown as separate servers. Alternatively, the SMS front-end server 720 and the aggregator server 730 could be implemented as a single server with the combined functionality of the aforementioned servers as described above. For instance, the single server (e.g., with the functionality of the SMS front-end server and the aggregator server) could receive and transmit one or more SMS messages to the communication device 705 and manage the user session using the sequence of numbers (e.g., as described by reference to FIGS. 1-5). Additionally, the single server could convert SMS messages for transmitting to a corresponding interactive service server (e.g., interactive service servers 750 and 760). Conjunctively, the single server could receive one or more messages from the corresponding interactive service server and convert such messages into SMS format for transmission to the communication device 705.

Although FIG. 7 illustrates four exemplary modules 722-728 for performing different functionality for the SMS front-end server 720, one of ordinary skill in the art would recognize that other modules could be provided to perform other functionality for the SMS front-end server 720 and still be within the scope of the subject technology. Moreover, one of ordinary skill in the art would appreciate that, in some configurations, the functionality provided in one respective module could be combined into another module. For example, the functionality of the transmission and reception modules 722 and 724 could be combined into one module for the SMS front-end server 720.

The following section describes an exemplary system that implements aspects of the above described invention.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 8:
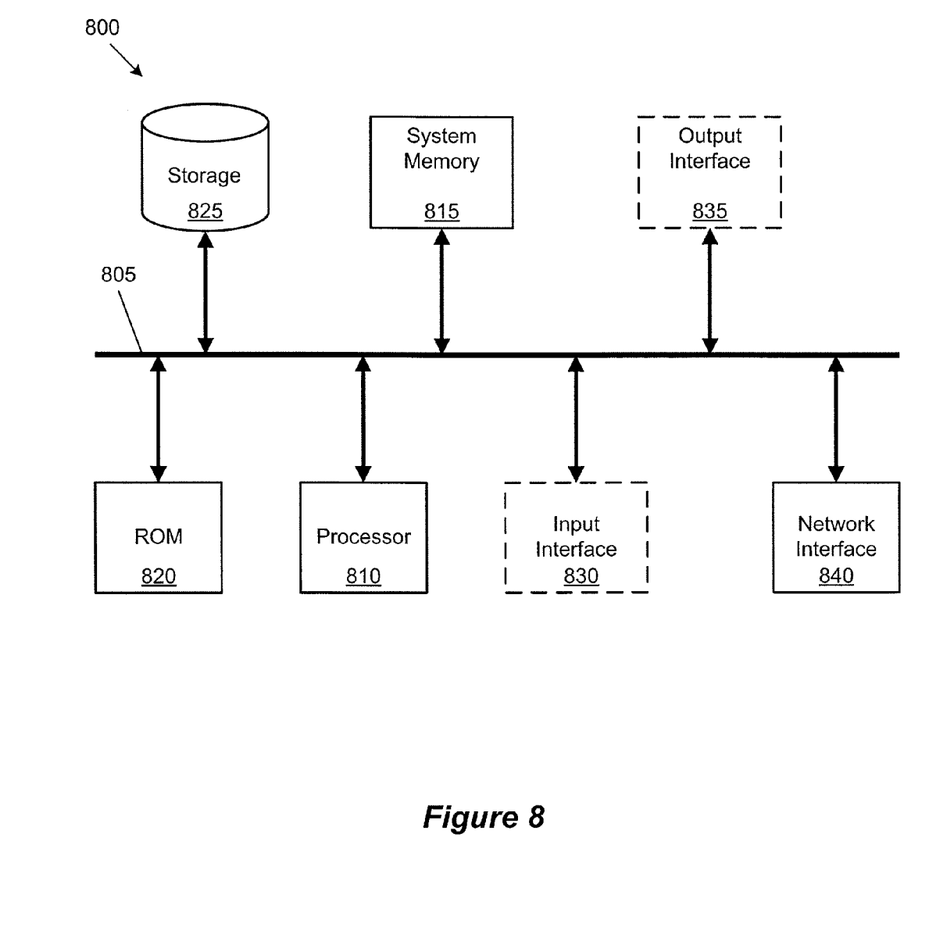
FIG. 8 conceptually illustrates a system with which some implementations of the subject technology may be implemented.

FIG. 8 conceptually illustrates a system 800 with which some implementations of the subject technology may be implemented. The system 800 can be a computer, phone, PDA, or any other sort of electronic device. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the invention. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the invention use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the invention's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. Any or all components of system 800 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A machine-implemented method for providing a multi-level user-interface over a Short Message Service (SMS) to enable functionality in an interactive system, the method comprising:
   receiving a first SMS message to initiate a user session associated with the interactive system;
   assigning an available first phone number from a sequence of phone numbers to a first level of a user interface (UI) within the interactive system;
   transmitting a second SMS message from the first phone number in response to the first SMS message, wherein the second SMS message includes a set of options corresponding to the first level of the UI;
   receiving a third SMS message from the first phone number, wherein the third SMS message includes a selected option from the first level of the UI;
   assigning an available second phone number from the sequence of phone numbers to a second level of the UI, wherein the second level of the UI corresponds to the selected option from the first level of the UI;
   transmitting a fourth SMS message from the second phone number in response to the third SMS message, wherein the fourth SMS message includes a set of options corresponding to the second level of the UI;
   receiving a fifth SMS message from the second phone number, wherein the fifth SMS message includes a selected option from the set of options corresponding to the second level of the UI;
   assigning an available third phone number from the sequence of phone numbers to a third level of the UI, wherein the third level of the UI corresponds to the selected option from the second level of the UI; and
   transmitting a sixth SMS message from the third phone number, wherein the sixth SMS message includes a set of options corresponding to a third level of the UI.

2. The method of claim 1, further comprising:
   changing the status of each assigned phone number to a busy status after assigning each assigned phone number for responding to a corresponding received SMS message.

3. The method of claim 1, wherein each phone number among the sequence of phone numbers is in a respective status.

4. The method of claim 3, wherein each respective status of each phone number among the sequence of phone numbers is one of a free, busy, or stale status.

5. The method of claim 4, wherein the free status indicates that a corresponding phone number is not currently assigned to a user session.

6. The method of claim 4, wherein the busy status indicates that a corresponding phone number is currently assigned to a user session.

7. The method of claim 4, wherein the stale status indicates that a corresponding phone number is inactive.

8. The method of claim 1, wherein assigning the first phone number to the first user session comprises determining a first phone number among the sequence of phone numbers currently in a free status.

9. A non-transitory system for providing a user-interface over a Short Message Service (SMS) to enable functionality in an interactive system, the system comprising:
- a session module configured to assign an available first number from a sequence of phone numbers to a first level of a user interface (UI) within the interactive system and to assign an available second number from the sequence of phone numbers to a second level of the UI;
- a reception module configured to receive a first SMS message from a communication device for interacting with the first level of the UI; and
- a transmission module configured to transmit a second SMS message for responding to the first SMS message over the second number to the communication device, wherein the reception module is further configured to receive a third SMS message from the communication device for interacting with a second level of the UI within the interactive system, and the transmission module is further configured to transmit a fourth SMS message for responding to the third SMS message over a third phone number from the sequence of phone numbers to the communication device,
- wherein the reception module is further configured to receive a fifth SMS message from the second phone number, wherein the fifth SMS message includes a selected option from a set of options corresponding to the second level of the UI,
- wherein the session module is further configured to assign an available third phone number from the sequence of phone numbers to a third level of the UI, wherein the third level of the UI corresponds to the selected option from the second level of the UI, and
- wherein the transmission module is further configured to transmit a sixth SMS message from the third phone number, wherein the sixth SMS message includes a set of options corresponding to the third level of the UI.

10. The non-transitory system of claim 9, wherein the first SMS message includes a selected option from a set of options from the first level of the UI.

11. The non-transitory system of claim 10, wherein the second SMS message is responsive to the selected option from the first level of the UI.

12. The non-transitory system of claim 9, wherein the third SMS message includes a selected option from a set of options from the second level of the UI.

13. The non-transitory system of claim 12, wherein the fourth SMS message is responsive to the selected option from the second level of the UI.

14. A non-transitory machine-readable medium comprising instructions stored therein, which when executed by a machine, cause the machine to perform operations comprising:
- receiving a first SMS message from a user to initiate a user session, wherein the user session is associated with the interactive system;
- assigning an available first phone number from a sequence of phone numbers to a first level of a user interface (UI) within the interactive system;
- transmitting a second SMS message over the first phone number in response to the first SMS message, wherein the second SMS message includes a set of options from the first level of the UI;
- receiving a third SMS message over the first phone number, wherein the third SMS message includes a selected option from the set of options from the first level of the UI;
- assigning an available second phone number among the sequence of phone numbers for responding to the third SMS message, wherein the assigned second phone number corresponds to a second level of the UI within the interactive system, and the second level corresponds to the selected option from the first level of the UI;
- transmitting a fourth SMS message over the second phone number in response to the third SMS message, wherein the fourth SMS message includes a second set of options from the second level of the UI;
- receiving a fifth SMS message over the first phone number, wherein the fifth SMS message includes a second selected option from the first level of the UI; and
- transmitting a sixth SMS message over a third phone number, wherein the sixth SMS message includes a third set of options from a third level of the UI.

* * * * *